(No Model.) 2 Sheets—Sheet 1.

T. A. TEATE.
CYCLOMETER.

No. 468,371. Patented Feb. 9, 1892.

Witnesses
H. G. Dietrich
J. Edgar Smith

Inventor
Thomas A. Teate

By his Attorneys,
C. A. Snow & Co.

(No Model.) 2 Sheets—Sheet 2.

T. A. TEATE.
CYCLOMETER.

No. 468,371. Patented Feb. 9, 1892.

Witnesses
H. G. Dieterich
J. Edgar Smith

Inventor
Thomas A. Teate.
By his Attorneys,
C. A. Snow & Co.

United States Patent Office.

THOMAS A. TEATE, OF WAUKEENAH, FLORIDA.

CYCLOMETER.

SPECIFICATION forming part of Letters Patent No. 468,371, dated February 9, 1892.

Application filed December 11, 1890. Serial No. 374,314. (No model.)

*To all whom it may concern:*

Be it known that I, THOMAS A. TEATE, a citizen of the United States, residing at Waukeenah, in the county of Jefferson and State of Florida, have invented a new and useful Cyclometer, of which the following is a specification.

This invention is an improvement in cyclometers, and has for its objects to provide an instrument whereby the number of revolutions of a wheel may be accurately recorded, and, furthermore, to provide a wheel-revolution measure which will be simple of construction, accurate in use, and cheap of manufacture.

With these objects in view the invention consists of the various novel details of construction and combination of parts hereinafter fully described, and particularly pointed out in the claim.

Figure 1:
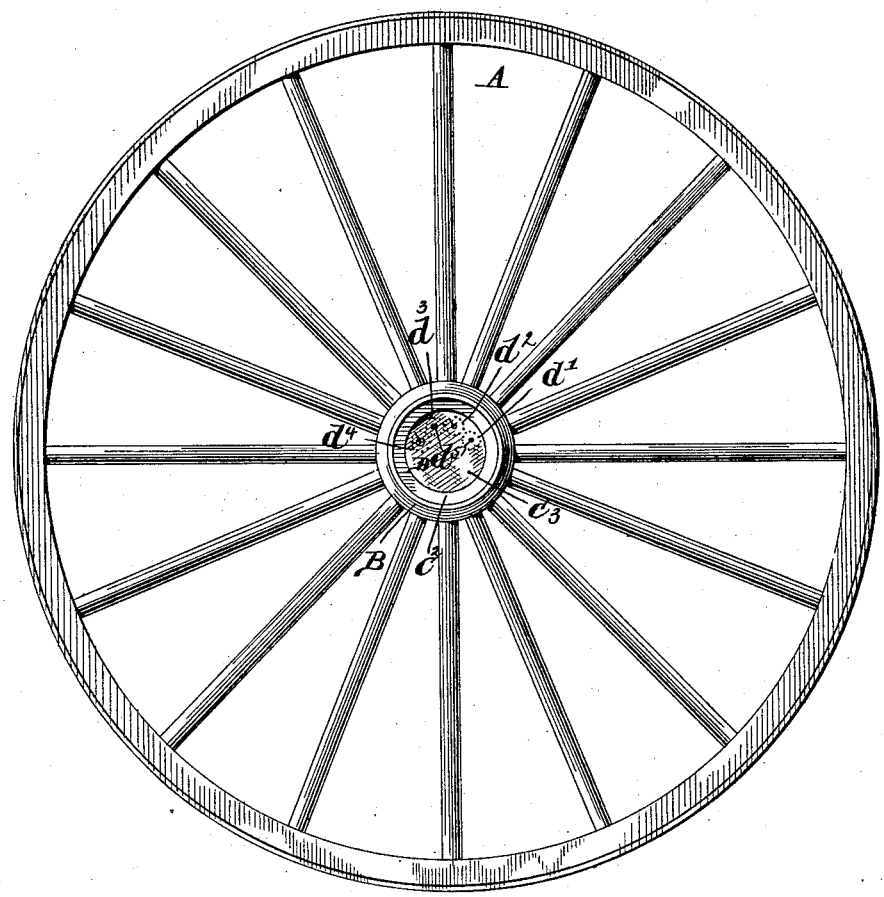
Figure 5:
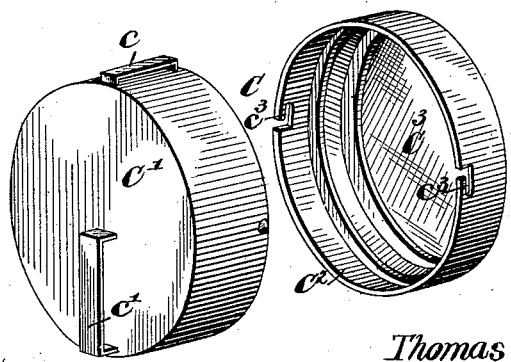
Figure 2:
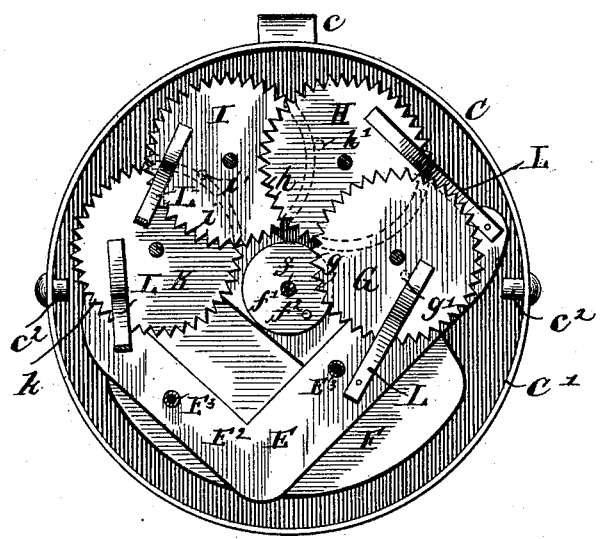
Figure 3:
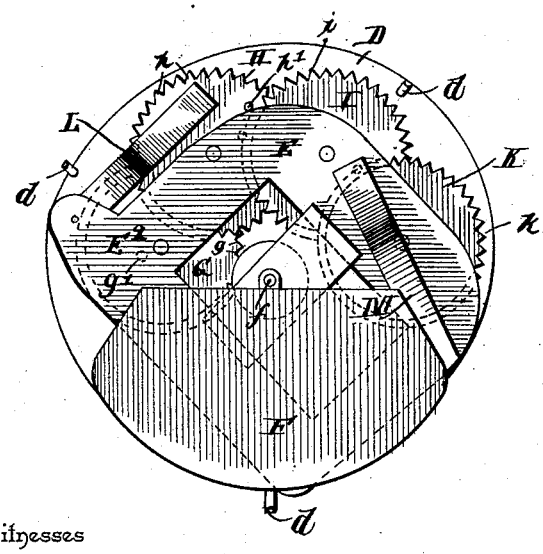
Figure 4:
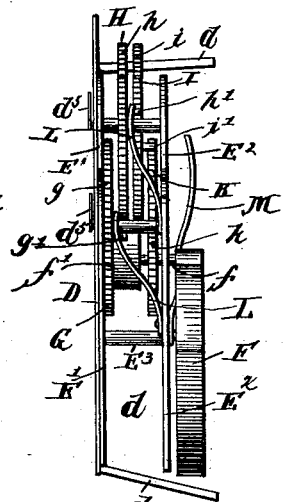

In the drawings, in which I have illustrated my invention, and in which like letters of reference indicate corresponding parts, Figure 1 is a front elevation showing my cyclometer attached to the buggy-wheel. Fig. 2 is a similar view, the front of the casing and the face-plate having been removed. Fig. 3 is a rear elevation of the device. Fig. 4 is a side elevation, and Fig. 5 is a view showing in detail the casing.

In the drawings, the letter A designates a wheel having a hub B. A cyclometer-casing C, which is provided with the loops $c$ and $c'$, is adapted to fit within and be retained by the hub B. The said casing C is composed of a lower portion C' and an upper portion $C^2$, adapted to fit within the lower portion. The upper portion $C^2$ has a transparent face $C^3$. Upon the inner side of the periphery of the lower portion are lugs $c^2$, adapted to fit within L-shaped slots $c^3$ upon the upper portion of the casing. Within the casing C are the works, which will now be described.

D indicates a face-plate to which the works are attached, and which has spacing-arms $d$ extending rearwardly, so that the works will be snugly held within the casing and prevented from receiving jars. The face-plate D has upon its outer side dials $d'$ and $d^2$ $d^3$ $d^4$, over which move single pointers or hands $d^5$. To the inner side of the face-plate the frame E, which holds the works, is attached in any suitable manner. This frame E is composed of a front plate E', a rear plate $E^2$, and braces $E^3$ connecting the two. Between these plates is journaled a number of cog-wheels having definite numbers of teeth and having tappets for intermittently moving each other. A central main shaft journaled in these two plates E' and $E^2$ projects through the rear plate and has upon its outer end a pendulum or weight F. This central shaft is designated as $f$ and has upon it a disk $f'$, from which projects a tappet $f^2$, which as the shaft revolves moves the cog-wheel G the space of one of its teeth $g$. This cog-wheel has upon its inner side a tappet $g'$, which once in every revolution of the wheel G moves the cog-wheel H by the space of one of its teeth $h$. This cog-wheel H has upon its inner side a tappet $h'$, which in every revolution of said cog-wheel H moves the cog-wheel I the space of one of its teeth $i$, and the said cog-wheel I has upon its inner side a tappet $i'$, which every revolution of the wheel I moves the wheel K by the space of one of its teeth $k$. All these cog-wheels are fast upon shafts the ends of which project through the face-plate D and have upon their outer ends the hands $d^5$.

L indicates leaf-springs, which are secured to the frame E at one end and have their free ends resting upon the sides of the cog-wheels above described for the purpose of steadying said wheels and of preventing motion in said wheels which might be derived from any source other than through the regular channel of the tappets moved by the central shaft. Upon the outer side of the plate $E^2$ is a leaf-spring M, which is provided to permit the frame to revolve in one direction, allowing at one time the passage of the pendulum F over said spring and preventing the passage of said pendulum over said spring at another time, and consequently preventing the revolution of the shaft $f$ when the frame revolves in the other direction.

As before stated, the device is intended to be attached to the hub of a wheel and to record the revolution of the wheel.

From the foregoing description it will be very evident that the casing turning with the wheel the works within the casing will also turn with the wheel, and as the pendulum is suspended from the end of a shaft which is journaled in the frame at a point at or near the mathematical center of the revolving wheel the said pendulum will maintain a vertical position as the wheel moves forward, and the frame revolving will be the same in effect as if the shaft on which the pendulum is hung revolves and the frame remained stationary. From this it will be seen that every revolution of the wheel will cause the hand upon the dial $d'$ to move one space, the spaces on the dial and the number of teeth in the cog-wheel G being equal.

It is to be understood that the spacing on all the dials corresponds to the number of teeth upon the wheels, which are fast upon the shafts, connecting with the dial-hands, and this being premised, it will be evident from what has already been said that every revolution of one of the transmitting-shafts will cause the next shaft beyond it to move the space of one of its teeth, and so on.

The drawings are made from a cyclometer which was made to measure the revolutions of a wheel, which has a periphery equal to one four-hundredth of a mile in length, and each of the cog-wheels has exactly twenty teeth and the dials twenty spaces each. Therefore twenty revolutions of the wheel will be registered by a complete revolution of the hand about the dial $d'$, and also by the movement of the hand upon the dial $d^2$, equal to one space. Four hundred revolutions of the wheel A will be recorded upon the dial $d^2$ by a complete revolution of the hand thereon, and upon the dial $d^3$ by a movement of the hand thereon equal to one space of said dial. A complete revolution of the hand about the dial $d^3$ will record a travel of twenty miles, and will be indicated upon the dial $d^4$ by movement of the hand thereon equal to one space of said dial, and so on.

It is to be observed that the number of teeth upon the cog-wheel and spaces on the dials, while they always correspond, may be varied in any suitable manner, and that while it is convenient to construct devices of this character with special reference to the size of wheels having known peripheries, this is by no means necessary, as any cyclometer made in accordance with my invention may be used with any wheel, the number of revolutions of the wheel ascertained by the cyclometer being multiplied by the periphery of the wheel to obtain the distance traveled.

It has already been stated that by means of the leaf-spring M the pendulum will be allowed to record the revolutions of the wheel only when the wheel moves forward, so that backing the wheel will not effect a final result.

In driving over rough roads the springs L will prevent movement of the wheels, as above described.

Having thus described my invention, what I claim as new, and desire to secure by Letters Patent, is—

In a cyclometer, the combination, with the face-plate having dials thereon, of shafts projecting through said plate and having hands moving over said dials, cog-wheels on said shafts having tappets on their inner sides, whereby the entire revolution of one cog-wheel will produce a partial revolution of the next, a weighted shaft for rotating the first of the series of wheels, and leaf-springs holding said wheels against accidental movements, substantially as and for the purpose set forth.

In testimony that I claim the foregoing as my own I have hereto affixed my signature in presence of two witnesses.

THOMAS A. TEATE.

Witnesses:
D. L. OAKLEY,
G. S. VAN BUSKIRK.